Figure 1:
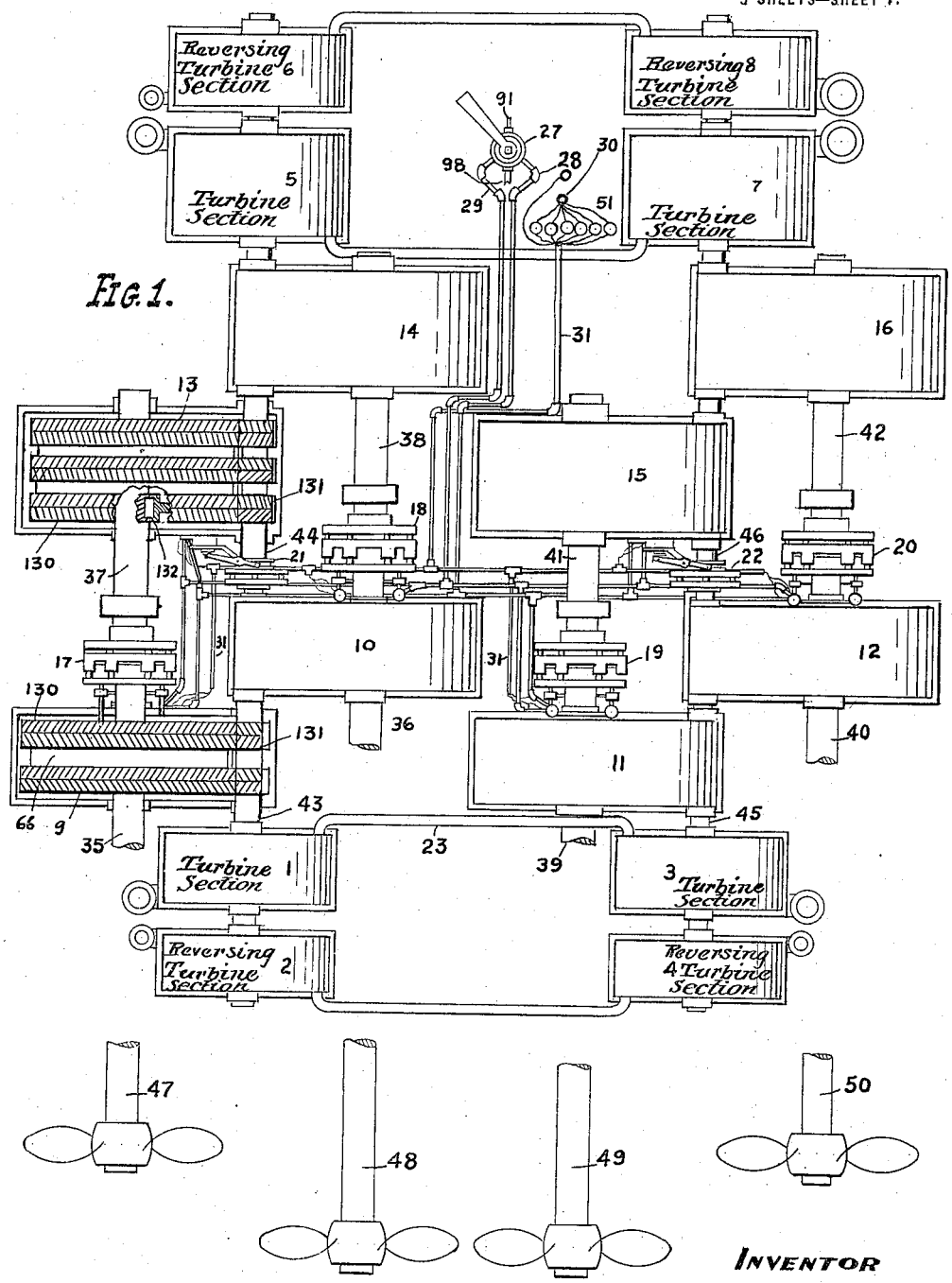

G. EDWARDS.
TORSION GEAR FOR MARINE PROPULSION.
APPLICATION FILED JAN. 26, 1917.

1,299,564.

Patented Apr. 8, 1919.
5 SHEETS—SHEET 1.

INVENTOR
GEORGE EDWARDS
By F. M. Wright,
Attorney

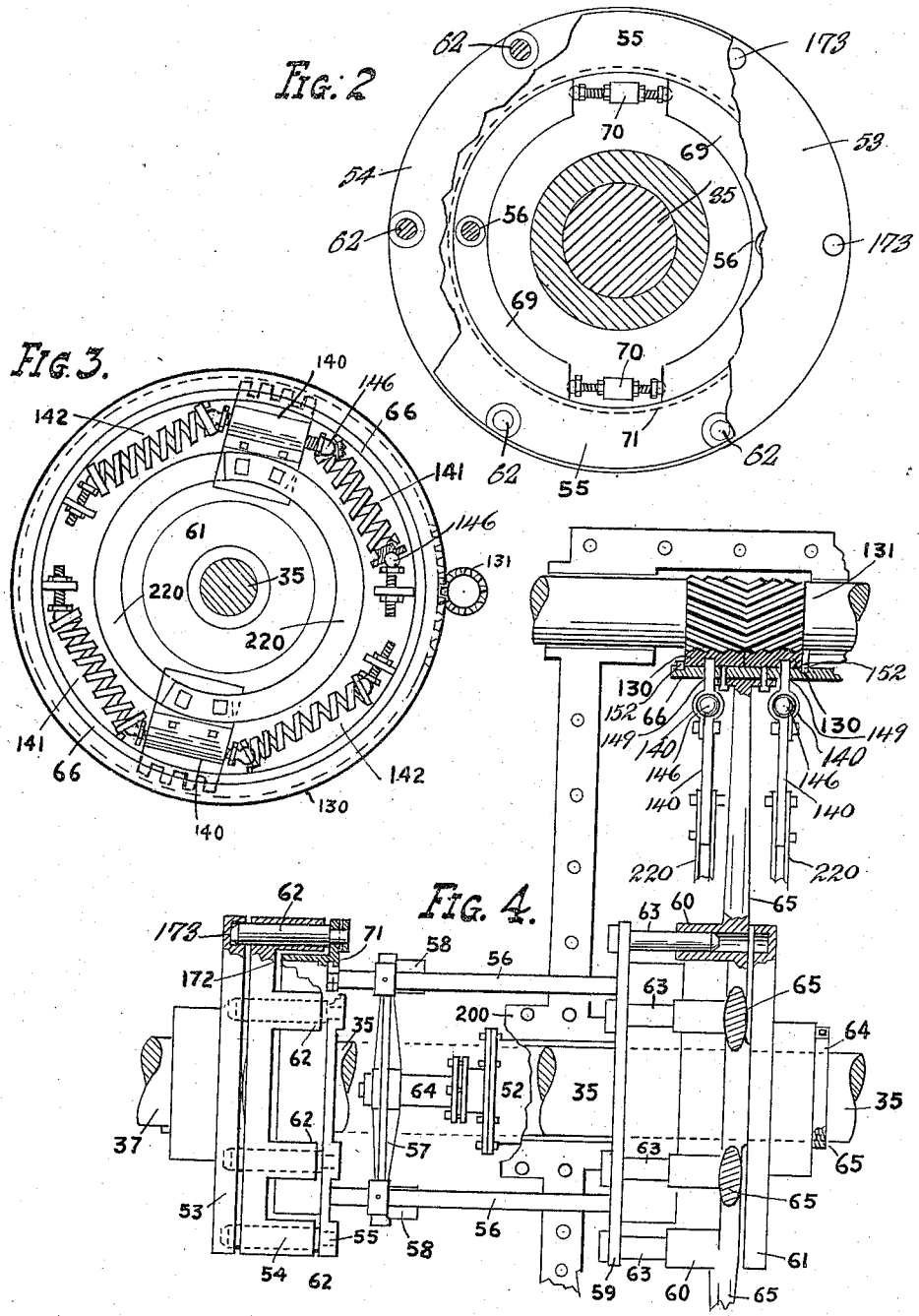

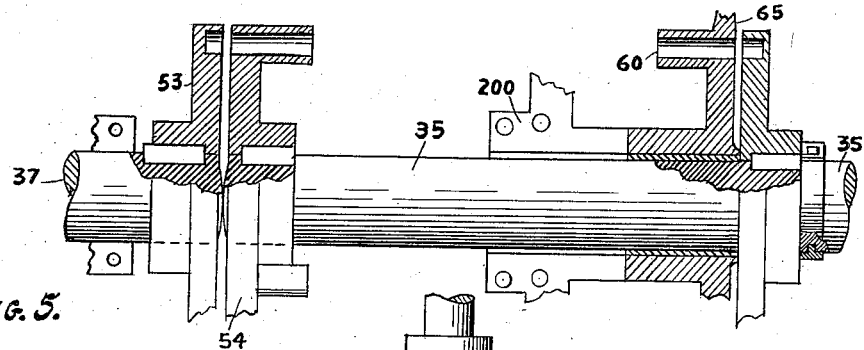
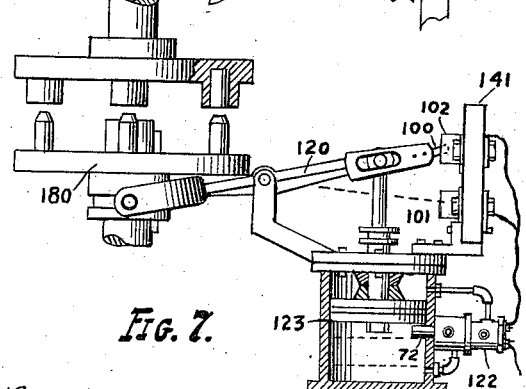
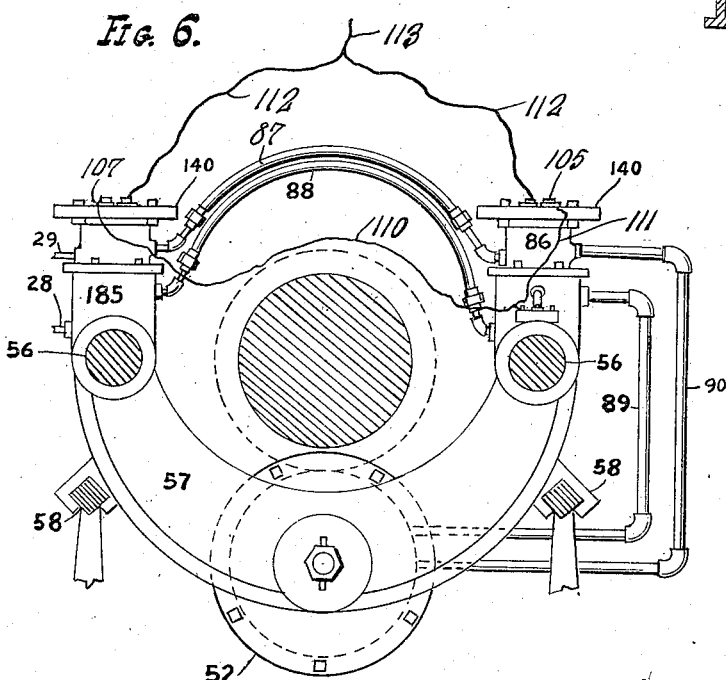

G. EDWARDS.
TORSION GEAR FOR MARINE PROPULSION.
APPLICATION FILED JAN. 26, 1917.
1,299,564.
Patented Apr. 8, 1919.
5 SHEETS—SHEET 4.
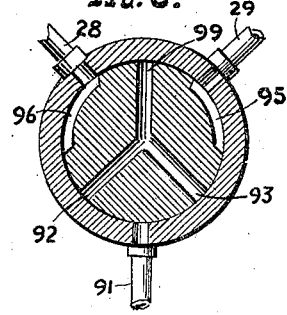
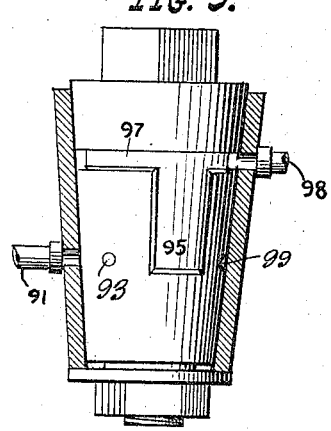
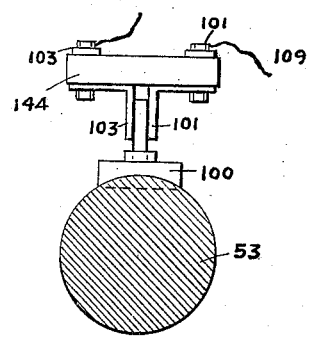
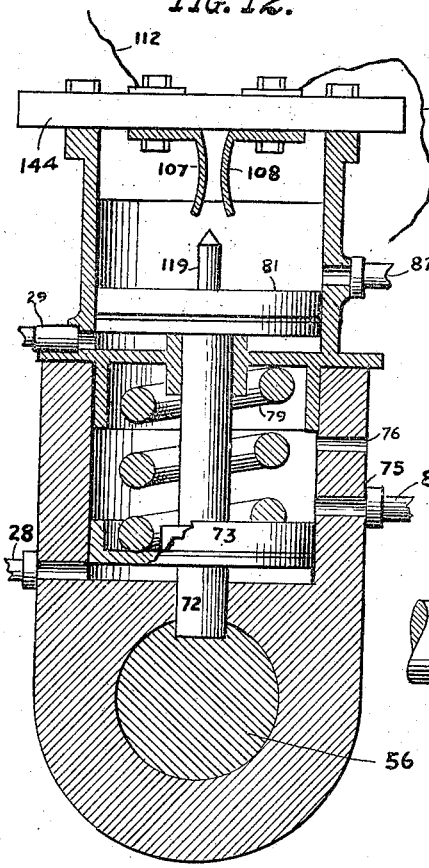
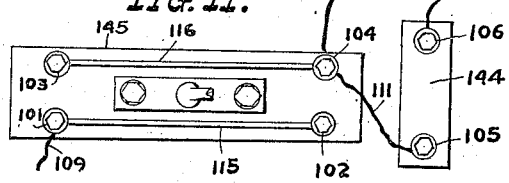
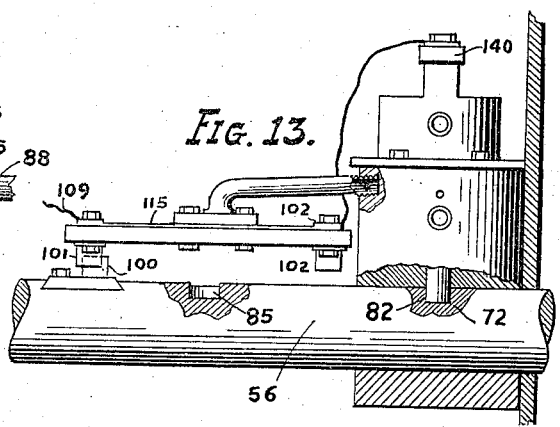
INVENTOR
GEORGE EDWARDS
By F. M. Wright
Attorney G. EDWARDS.
TORSION GEAR FOR MARINE PROPULSION.
APPLICATION FILED JAN. 26, 1917.
1,299,564.
Patented Apr. 8, 1919.
5 SHEETS—SHEET 5.
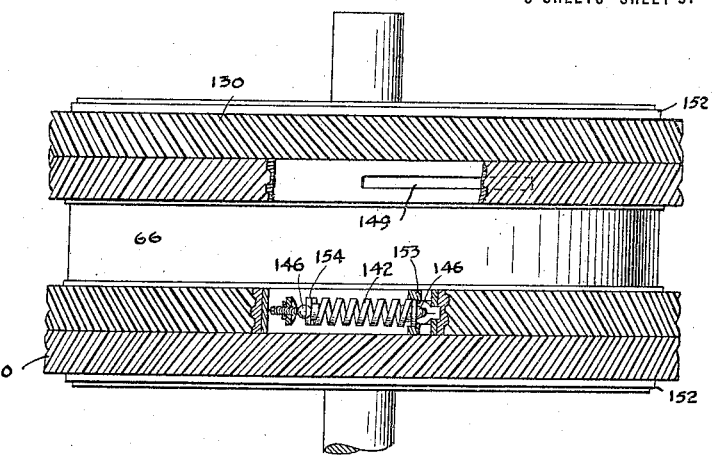
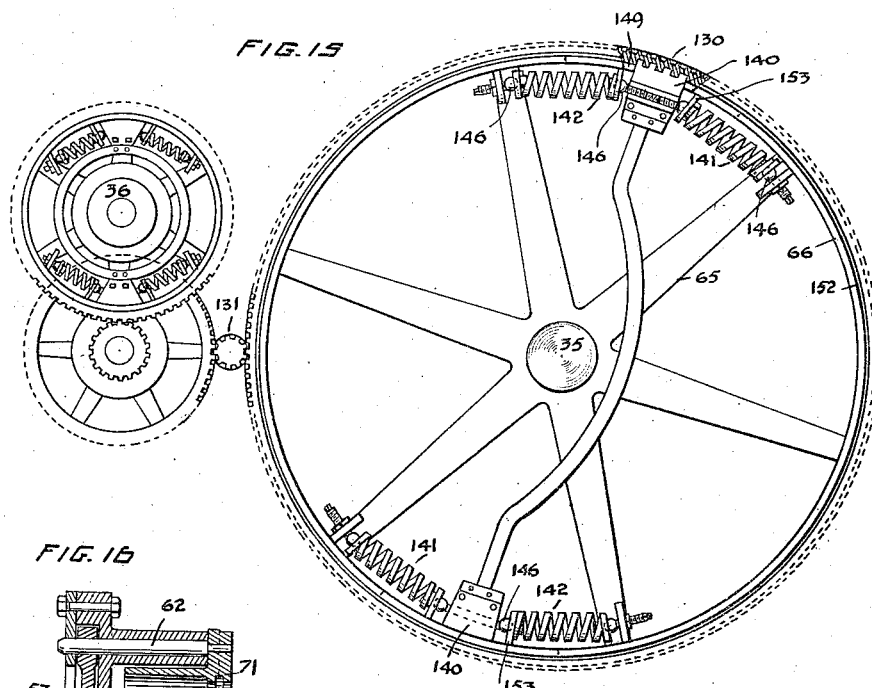
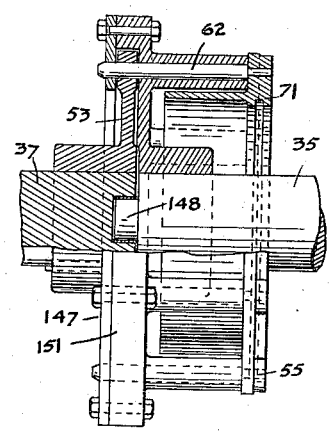
INVENTOR
GEORGE EDWARDS
BY F. M. Wright,
ATT'Y.

UNITED STATES PATENT OFFICE.

GEORGE EDWARDS, OF BERKELEY, CALIFORNIA.

TORSION-GEAR FOR MARINE PROPULSION.

1,299,564.          Specification of Letters Patent.     Patented Apr. 8, 1919.

Application filed January 26, 1917.   Serial No. 144,628.

*To all whom it may concern:*

Be it known that I, GEORGE EDWARDS, a citizen of the United States, residing at Berkeley, in the county of Alameda and State of California, have invented new and useful Improvements in Torsion-Gears for Marine Propulsion, of which the following is a specification.

The purpose of my invention is to attain the highest efficiency in the use of the steam turbine and of the marine screw for ship propulsion.

The steam turbine is most efficient when rotating at high and at constant speed; at full load; and when delivering a maximum amount of power. The marine screw is most efficient when rotating at a speed lower than is best adapted to the steam turbine.

It is desirable with fighting ships to consume a minimum amount of fuel both at cruising speed and at full speed. My invention meets all of these conditions.

Figure 1 is a diagrammatic representation of my preferred arrangement of a steam turbine element, divided into sections, gears and other mechanism, when a vessel has a plurality of screw shafts, the turbine sections imparting power to said shafts through pinions and gears, which employ any preferred method of avoiding the destructive stresses of torsion when transmitting high powers. Fig. 2 shows part of the clutch shifting mechanism. Fig. 3 shows a means for adjusting gear rings to equalize the load. Fig. 4 is a view of the shaft clutches. Fig. 5 shows method of attaching clutches to the shafts and the bearing of a gear on one of such shafts. Fig. 6 shows part of the clutch-shifting mechanism, partly in cross-section and mainly in plan view. Fig. 7 shows a different form of the clutch-shifting and signaling mechanism, partly in cross section. Figs. 8 and 9 are different views of the steam valve that controls the shaft clutches partly in cross-section and partly in plan view. Fig. 10 and Fig. 11 are partial presentations of the electric control for pilot lamps to indicate whether the shaft clutches are properly locked. Fig. 12 illustrates, mainly in cross-section, a method for locking the shaft clutches in working position. Fig. 13 is a different view of the clutch-locking device and of the electrical connections. Fig. 14 is an enlarged view of a drum, showing details. Fig. 15 shows a pinion driving a single gear and also compound gears. Fig. 16 shows an alternative construction of a clutch.

In Fig. 1 a section of the steam turbine element 1 drives pinion shaft 43, intermeshing with gears 9, 10, and their shafts 35, 36 connected with the screw shafts 47, 48. If three or four screw shafts are used, section 3 of the steam turbine element 3 will similarly drive, by the pinions and gears 11, 12, screw shafts 49, 50. The reversing sections of the turbine element are shown at 2 and 4. With three or four or more screw shafts, greater steam economy will be attained if section 1 of the turbine element uses steam at high pressure and discharges its steam at a partial reduction of pressure to section 3 of the turbine element, by the pipe 23 where the remaining power of the steam is consumed. If more than four screw shafts are used, a third section of the turbine element may be in the series of steam reduction. This gives the steam flow an efficiency of a single turbine, with the power of both sections 1 and 3 of the turbine element, and causes but a slight loss in transmission by the pipe 23. The reversing sections 2, 4, of the turbine element may be likewise arranged.

The mechanism thus far described is placed nearest the screws and is the set of sections of the turbine element and gears which normally will be most used. Farther from the screws are similarly arranged sections 5, 7 of the turbine element and reversing sections 6, 8, of the turbine element which are used to give the vessel additional driving power.

The gear-shaft 37 may be united to or disconnected from the shaft 35 by the clutch 17; the shaft 38 to the shaft 36 by the clutch 18; the shaft 41 to the shaft 39 by the clutch 19; and the shaft 42 to the shaft 40 by the clutch 20. Similarly the pinion shaft 43, may be united to or disengaged from the pinion shaft 44, by the clutch 21; and the pinion shaft 45, has a similar relation to the shaft 46, by the clutch 22.

In the propulsion of the fighting ships, if four shafts are used, the sections 1 and 3 of the turbine element will drive the gears 9, 10, 11, 12, when the vessel is at cruising speed. At full speed when the maximum power is required, the clutches 17, 18, 19, 20 will unite the shafts 35, to 37; 36 to 38; 39 to 41; 40 to 42; and the clutch 21, will unite the pinion shaft 43, to 44, and the clutch 22, the shaft 45, to 46; the cruising gears 9, 10, 11, 12, will be unclutched from their shafts 35, 36, 39, 40; the high-speed gears 13, 14, 15, 16 and their pinions will drive the screw shafts 47, 48, 49, 50. The power of the cruising sections 1, 3, of the turbine element will be added to that of the full-speed sections 5, 7 of the turbine element. The gain in screw speed is obtained by using a smaller ratio of speed reduction with the gears and pinions 13, 14, 15, 16 than in the cruising gears and pinions 9, 10, 11, 12. The speed of rotation of the turbine element remains constant. This difference in the ratio of speed reduction may be varied at will, as the centers of the gear shafts 35, 37, 36, 38 are parallel with the center of the pinion shafts, 43, 44; and 39, 41, 40, 42 are similarly arranged with 45, 46. This construction is not limited to a cruising speed fixed at one half the full speed of the screw shafts.

At cruising speed, the high-speed gears and sections of the turbine element are stationary and are entirely disconnected from the moving parts of the cruising mechanism.

In merchant ships, where greater power is required to drive a full-loaded ship than a light-loaded ship, section 1 of the turbine element may be of less power than section 5; and 3 of less power than 7, if three or four screw shafts are used. Clutches may be interposed in the pinion shafts at 43 and 45, enabling sections 1, 3, of the turbine element to be disengaged and remain stationary when the more powerful sections 5, 7, of the turbine element will drive the vessel.

It is obvious that the section 3 of the turbine element may drive a single screw shaft 49, if the ship has but three screws. When a ship does not require a cruising speed and a full speed, or different powers for propulsion, a vessel of two screw shafts 47, 48 will be driven solely by sections 1, 2, of the turbine element and the gears and pinions 9, 10. If the vessel has a third screw shaft 49, sections 3, 4, of the turbine element will be added; and if four screw shafts are used there will be added the gear and pinion 12. If five or six screw shafts, or more, are used a like combination is available. Also, a ship of two screw shafts may have the combination of gears and sections of the turbine element indicated by 1, 2, 5, 6, 9, 10, 13, 14.

All the clutches are operated by a single steam valve 27. The steam is carried by pipes 28, 29, to steam pistons and cylinders that operate the shaft clutches; one pipe 28, distributing steam to one side of said pistons, and the other pipe 29 to the opposite side of said pistons, connections being made with the several steam cylinders so that all clutches will operate as desired. The valve 27 and the pipes 28, 29, also serve to exhaust steam from the cylinders after the clutches have been operated. Each clutch will be electrically connected with a lamp and all lamps grouped conveniently at 51 near the valve 27, to disclose operation of the clutches.

In Fig. 4, the shafts 37 and 35, of Fig. 1 are likewise numbered. The part of the high-speed clutch that is keyed to the shaft 37 is 53. The part, 54 of this clutch, which carries the locking pins 62, is keyed to the shaft 35 as is shown clearly in Fig. 5. In the cruising speed clutch, the gear spokes 65, connected with the gear drum 66, are integral with part of the clutch 60. It is supported by the gear shaft 35. When the cruising gear is out of clutch, its bearing is its shaft 35. The bearing for shaft 35 is shown at 200.

A steam cylinder 52 and piston operate the rod 64, connected with the yoke 57, which is attached to the rods 56, 56. The ends of the rods 56 are connected at each end with connecting arcs 69, 69, entering a groove 71, and so impart reciprocating motion of the steam piston to the pins 62, 63 and engage or disengage their respective clutch parts 53, 61. The throw of the piston is sufficient to disengage the pins 63, before the pins 62 are engaged. The arcs 69, 69, are held in position by turn-buckles 70, 70. The yoke 57 should have bearings 58, 58. To prevent displacement of 61 by the steam pressure on the pins 63, this part of the clutch 61 may be supported by a clamp 64, slightly recessed as shown at 65, in its shaft 35.

To hold the gear clutches in their working positions, a locking bolt 72 alternately enters the recesses 82, or 85, in the gear shifting rods 56. When steam is admitted by the control valve 27 to the pipe 28, it acts upon a piston 73 and withdraws the bolt 72, until the vent 75 is passed by the piston and allows the steam to flow from the lock-control device 185 by the pipe 88 to a similar lock-control device 86, and so withdraw the bolt from the second rod 56, and allows steam to pass thence by the pipe 89 to the main clutch shifting cylinder 52. When the central steam control valve 27 is turned to exhaust, the outflow of steam allows the spring 79 to force the bolt 72 into locking position in the recess 82 or 85. Residuary steam in cylinder 52 has a vent at 76. To move the clutch pins 62, 63, to engage the other clutch, a similar operation is followed by the inlet 29, piston 81, pipe 87, control mechanism 86, pipe 90 to the opposite side of the piston of the cylinders 52.

The central steam control valve 27 has a steam supply pipe 91. In the valve plug, three passages 92, 93, 99 are drilled, all meeting at the center. When the plug is turned to take steam by the passage 92, the steam will be delivered to pipe 28; and when turned to take by 93, will supply steam to pipe 29. Around the plug is turned a recess 97, connected with the exhaust steam passage 95, 96, giving outflow by a waste pipe 98. When the plug is turned to middle position, steam is cut off from inlet pipe 91 and both pipes 28, 29 are on exhaust, and all clutches should be locked.

Dovetailed in one of the clutch shifting rods 56, is a brass electrical bridge 100, passing between two electrical terminals 101, 103, at one end of the throw, allowing electricity to pass from a wire conduit 109 through 101 to 103 and by conduits 116, 110 to terminal 107. In the end of the bolt 72 is inserted a brass rod 119, which bridges the electric terminals 107, 108 and allows the current to pass it by lines 112, 113, through an electric wire conduit 31 to its particular lamp in the group 51, and to the electric supply 30 and complete the circuit. When the rod 56 is on its opposite throw, a like circuit is established, through conduits 109, 115, 102, 104, 111, 105, 106, 112, 113.

When the steam valve 27 is on exhaust, the electric circuit is broken by retraction of the bridge 119, in both controls 85, 86, and the electric lights are extinguished. When the electric bridge 100 is passing from terminals 101, 103, to the others 102, 104, the electric circuit also is broken. When steam is admitted to shift the clutches, if all the electric bulbs light, blink, relight, and extinguish when steam is on exhaust, it will be known that all the clutches have been shifted and locked. If any lamp fails to do so, it will be known that something is wrong.

The clutches shown on the gear shafts have the merit of moving merely the locking pins 62, 63. If preferred, the ordinary clutch may be used, as shown in Fig. 7. It is shown on the pinion shafts at 21, 22, the movable part 180 having pins that engage, or are freed by moving the body of, the clutch by the pivoted arm 120, actuated by the piston 123. The locking mechanism 122 throws the bolt 72 to hold the piston 123 and the clutch at either end of the throw of the clutch. The width of the piston 123 and of the bolt 72 are together equal to the throw of the clutch.

On the gear drums 66 are carried a series of annular gear rings 130, receiving power from the intermeshing pinions 131. The parts, 140, serve to connect the displaceable gear rings 130, by threaded stems, clamped therein and terminating in a ball 146, which resting in a socket, is a support for the springs 141, 142. Power is conveyed from the springs by similar sockets, balls and stems; and attachments 155 to the drum, 66. By this drum the power is transmitted to the shaft 35, or by the clutch 37, by proper connections. The springs, 141, transmit power during rotation in one direction; and the springs 142 during rotation in an opposite direction. The parts 220, being bolted to the parts 140, support the parts 140, in their working position. The parts, 220, as shown, are given a diameter sufficient to clear the clutch, which they surround. When their position is such that they merely avoid the shaft 35, they may pass more directly between the two parts, 140. The parts 140, should be standardized and be as simple as possible. The connecting strips 220, should be as simple in form as the construction will permit.

The gear-rings, 130, are displaceably mounted on a drum 66, pierced by slots 149. The gear-rings may be retained in working position by open bands of cold rolled steel 152, that enter grooves, cut in the drum. Power-transmitting blocks, 140, extend through the slot, 149, and engage the inner face of the gear rings 130. The springs 141, 142, when at rest, have secondary supports 153.

The diminution in radial space occupied by compound gears, over single reduction gears is shown visually in Fig. 15. The drawing approximates to scale. The speed reduction from the pinion 131 is 20 to 1 in the shaft 35 and in the shaft 36. With compound gears it frequently will happen that special torsion compensating devices are required, only on the final gear, where the rotation is slower and a greater length is required across the face of the teeth.

Compound gears permit use of small, light and cheap steam turbine element, rotating at high speed. A high-speed turbine element, ordinarily, should have a higher steam efficiency than a larger and slower-rotating turbine element of the same power; and this gain in steam efficiency should more than offset the increased loss of power in the intermeshed teeth of compound gears.

If it is desired to have one pinion shaft drive two screw shafts, the direction of rotation of one screw to the other screw is important. If single reduction gears are used with both screw shafts, or compound gears with both screw shafts, both screws will rotate in the same direction. But, if single reduction gears are used with one screw shaft and compound gears with the other screw shafts, one screw will rotate in an opposite direction from the other screw. Compound gears also permit varying the distance between screw shafts by varying the position of one gear to its mate. The designer, therefore, has freedom in determining the direction of rotation of and the distance between screw shafts.

Use of coiled springs for a torsion-compensating means will give the same reliable adjustment; that is given by coiled springs when used in steam turbine governors.

In the alternative clutch design, shown in Fig. 16, the locking pin 62 is given support on both sides of its load. An annular extension 151 of the body of the clutch supports a face plate 147 which gives bearing to the end of the pin 62 when in locking position. The clutch may be centered by a projection 148 extending from one shaft into the other shaft.

The high speed drum in the gear 13 may be keyed, as at 132, to its shaft 37, or detachably connected thereto; and the low speed gear 9 may be detachably connected with its shaft 35.

In Fig. 3 such connection is by the power-transmitting blocks 140 united by yokes 220. The load is transferred by the springs 141 or 142 to the drum 66, which transfers this power by spokes 65 or other suitable connection with its shaft 35.

Torsion compensating gears without a common drum may be used if preferred, or a gear may be built of disks or plates, displaceable axially.

Fig. 1 shows the gears and pinions occupying a maximum space. If the gear shafts are far enough apart, the gears may face each other instead of being staggered and the over-all length will be greatly reduced. Electrical insulation is shown at 144 and 145.

As the power and speed given to the screw shaft 47, and by like construction to the other screws, is varied by using turbine, or turbine section, 1 separately from turbine, or turbine section 5 and by uniting together the powers of these two turbines, or turbine sections, it is apparent that more than two speeds may be given to screw shaft 47, by varying the speed with which these turbines, or turbine sections, rotate.

As the power required to increase the speed of a vessel increases, approximately, as the cube of the increase in the speed of the vessel, it is apparent that this rapid increase of required power, can be applied by using additional turbine sections, of appropriate power, for each successive increment in the speed of the vessel. This will be illustrated by assuming that 2 is a high-pressure turbine section, and that sections, 1, 5, 6, are reduced pressure turbine sections, receiving steam by appropriate conduits and control valves from section 2. All of these several sections being supplied with steam simultaneously, or only part of them being given steam, according with the amount of power that may be required, will permit of great variety in the speed of a vessel. A still greater variety of powers and speeds may be obtained by assuming that a similar arrangement of turbine sections obtains with 4, 3, 7, 8, and that suitable conduits and control valves permit cross supply of steam from series 2, 1, 5, 6, to series 4, 3, 7, 8.

If preferred one of the gears 9 or 13; 10 or 14; 11 or 15; 12 or 16, and the clutches, may be omitted, and the speed of the screw be varied entirely by varying the speed of the turbine sections.

It is also apparent that gears 10, 14, and 11, 15, may be omitted, and only screw shafts 47, 50 be supplied with power from the turbine sections.

In these constructions, one or more reversing turbines are to be considered to be within the exhaust end of some, or of all, of the turbine sections, 1, 5, 6, 3, 7, 8, following common practice.

It is apparent that all of the sections 2, 1, 5, 6, may be placed together on one side of the gears if desired, if a single gear is used.

I claim:—

1. In marine propulsion by a screw, two shafts and power transmitting rotary means, carrying teeth, operatively connected with the first shaft, more than two power-transmitting means, carrying teeth, operatively connected with the second shaft, the first teeth intermeshing with the second teeth to transmit said power, means for substantially equalizing upon the teeth of said second means the stress caused by transmitting said power, operative connection between one of said shafts and said screw, said power being supplied by a steam turbine element, sectionally divided, and the amount of power which is supplied to said screw capable of being varied by varying the number of said sections to which steam is supplied.

2. Means or apparatus according to claim 1 and also having selective means by which said variations in the power supplied may be obtained by use of a common controlling device.

3. Means or apparatus according to claim 1 and also wherein at least one of said turbine sections shares steam in series with a turbine section which imparts power to a second marine screw.

4. Means or apparatus according to claim 1 and also having centrally controlled locking mechanism to retain said power in operative connection with said screw.

5. Means or apparatus according to claim 1 and also having centrally controlled locking mechanism to retain said power in operative connection with said screw, and means to signal that said locking mechanism is operative, or non-operative.

6. Means or apparatus according to claim 1 and also means to prevent conflicting applications of power being attempted simultaneously.

7. Means or apparatus according to claim 1 and also wherein said variations in the power supplied is obtained in part by the union and by the separation of pinion shafts.

8. Means or apparatus according to claim 1 and also wherein said power is distributed to a plurality of marine screws.

9. Means or apparatus according to claim 1 and also wherein said power is imparted to a plurality of gear shafts.

10. In marine propulsion, means for varying the propulsive power of a screw, consisting of a plurality of steam turbine sections, said sections being designed to use steam from which power has been partially extracted, part of said sections separately, and all jointly, having means for transmitting power from said steam to the same pinion teeth, which transmit said power by operative connections to said marine screw.

11. Means or apparatus according to claim 10, and also having operative means by which part of said steam supplies power to a second screw.

GEORGE EDWARDS.

Copies of this patent may be obtained for five cents each, by addressing the "Commissioner of Patents, Washington, D. C."